(12) United States Patent
Sugahara

(10) Patent No.: US 6,185,366 B1
(45) Date of Patent: Feb. 6, 2001

(54) METHOD FOR RECORDING AND REPRODUCING CODED SIGNAL AND, APPARATUS FOR RECORDING AND REPRODUCING THE CODED SIGNALS TRANSMITTED

(75) Inventor: Takayuki Sugahara, Yokosuka (JP)

(73) Assignee: Victor Company of Japan, Ltd., Yokohama (JP)

( * ) Notice: Under 35 U.S.C. 154(b), the term of this patent shall be extended for 0 days.

(21) Appl. No.: 09/033,018

(22) Filed: Mar. 2, 1998

(30) Foreign Application Priority Data

Aug. 29, 1997 (JP) .................................... 9-249771

(51) Int. Cl.$^7$ ...................................... H04N 5/92
(52) U.S. Cl. ............................. 386/112; 386/125
(58) Field of Search ................ 386/46, 68, 111, 386/112, 125, 126, 109; 369/60, 48

(56) References Cited

U.S. PATENT DOCUMENTS 5,134,499 * 7/1992 Sata et al. ............................ 386/126
5,432,769 * 7/1995 Honjo .................................... 369/60
5,974,223 * 10/1999 Uchide ................................. 386/109

* cited by examiner

Primary Examiner—Huy Nguyen
(74) Attorney, Agent, or Firm—Anderson, Kill & Olick P.C.

(57) ABSTRACT

A method for recording and reproducing a coded signal on/from a recording medium of a recording and reproducing apparatus. The coded signal is coded at a predetermined coding rate and transmitted to the apparatus for a time shorter than an actual reproduction time at a transmission rate higher than the coding rate. The method comprises the steps of recording the coded signal transmitted on the recording medium at a first transmission rate substantially equal to the transmission rate; reproducing the coded signal recorded in the recording medium at the first transmission rate so as to store the coded signal in a buffer memory; and decoding the coded signal from the buffer memory at the coding rate to reproduce in real time by interrupting the reproduction of the coded signal responsive to a coded signal share in the buffer memory.

4 Claims, 5 Drawing Sheets

METHOD FOR RECORDING AND REPRODUCING CODED SIGNAL AND, APPARATUS FOR RECORDING AND REPRODUCING THE CODED SIGNALS TRANSMITTED

BACKGROUND OF THE INVENTION

1. Field of the Invention

The present invention relates to a method for recording and reproducing coded signals of a motion picture (video signal) and a sound (audio signal), and an apparatus for recording and reproducing the coded signals transmitted from a transmission system to and from a recording medium, and particularly, relates to a recording and reproducing apparatus capable of performing a decoded reproduction in real-time processing while the coded signal transmitted from the transmission system is recorded in the recording medium.

2. Description of the Related Art

Presently, as to an apparatus for recording and reproducing a coded signal transmitted from a transmission system, there is proposed a method for reproducing in real time the coded signal which has been transmitted for a time shorter than an actual reproduction time of a program, for instance, a 2-hour reproduction time and is recorded in a recording medium by making use of a transmission system capable of transmitting the coded signal at a transmission rate higher than a coding rate.

In the method in the prior art mentioned above, the transmission time of the data depends on an actual reproduction time and the transmission rate of the program.

Exemplarily, when a 2-hour program having the transmission rate of 4 Mbps is intended to be transmitted for 10 minutes, it requires a transmission band of 48 Mbps which is 12 times as large as that of 4 Mbps.

FIG. 1 is a chart showing a time relation between the transmission time of data of a program and a reproduction time of the data thereof in the prior art.

As seen from FIG. 1, after the start of the data transmission (TMS) of a program, it takes 10 minutes to transmit all the data of a program. It should be noted that the data trasmitted are instantly recorded in the recording medium. Thus, there is needed a waiting time of 10 minutes before the reproduction of the program.

In order to obtain an enough performance, it requires a rather large transmission band width. On the contrary, when the transmission band width are limited, it requires a long transmission time. This poses problems of the long waiting time and degradation of image and sound quality due to the suppression of the transmission rate.

SUMMARY OF THE INVENTION

Accordingly, a general object of the present invention is to provide a coded signal transmission recording and reproducing apparatus, in which the above disadvantages have been eliminated.

A specific object of the present invention is to provide a method for recording and reproducing a coded signal on/from a recording medium of a recording and reproducing apparatus, the coded signal being coded at a predetermined coding rate and transmitted to the apparatus for a time shorter than an actual reproduction time at a transmission rate higher than the coding rate, the method comprising the steps of: transmitting the coded signal for a time shorter than an actual reproduction time at a transmission rate higher than the coding rate; recording the coded signal transmitted on the recording medium at a first transmission rate substantially equal to the transmission rate; reproducing the coded signal recorded in the recording medium at the first transmission rate so as to store the coded signal in a buffer memory; and decoding the coded signal from the buffer memory at the coding rate to reproduce in real time by interrupting the reproduction of the coded signal responsive to a coded signal share in the buffer memory.

Another and more specific object of the present invention is to provide an apparatus for recording and reproducing a coded signal on/from a recording medium, the coded signal being coded at a predetermined coding rate and transmitted for a time shorter than an actual reproducing time at a transmission rate higher than the coding rate, the apparatus comprising: recording means for recording the coded signal transmitted on the recording medium at a first transmission rate substantially equal to the transmission rate; reproducing means for reproducing the coded signal recorded on the recording medium at the first transmission rate; buffer memory for storing the coded signal reproduced by the reproducing means; reproducing control means for interrupting a reproducing operation of the reproducing means when the buffer memory is filed with a certain amount of the coded signal; and decoding means for decoding the coded signal from the buffer memory at the coding rate to reproduce in real time by using the reproducing control means.

Another and more specific object of the present invention is to provide an apparatus for recording and reproducing a coded signal on/from a recording medium, the coded signal being coded at a predetermined coding rate and transmitted for a time shorter than an actual reproducing time at a transmission rate higher than the coding rate, the apparatus comprising: a first buffer memory for storing the coded signal at a first transmission rate substantially equal to the transmission rate; recording and reproducing means for recording the coded signal outputted from the first buffer memory on a recording medium at a second transmission rate higher than the first transmission rate, and for reproducing the coded signal recorded on the recording medium at the second transmission rate; recording control means for issuing a recording instruction to the recording and reproducing means when the first buffer is filled with a certain amount of the coded signal reproduced by the recording and reproducing means; a second buffer memory for storing the coded signal reproduced by the recording and reproducing means at the second transmission rate; reproducing control means for interrupting a reproduction operation of the recording and reproducing means when the second buffer memory is filled with a certain amount of the coded signal; and decoding means for decoding the coded signal from the second buffer memory at the coding rate to reproduce in real time by using the reproducing control means.

Other objects and further features of the present invention will be apparent from the following detailed description.

DETAILED DESCRIPTION OF THE PREFERRED EMBODIMENT

The description is given of embodiments of a method and an apparatus for recording and reproducing the coded signal in the present invention referred to drawings, wherein a RAM (random access memory) disc system capable of recording and reproducing an information signal is used as a recording medium.

In the present invention, as the apparatus capable of recording and reproducing coded information signals transmitted from a transmission system and storing the signals in the RAM disc during recording operation, there are two type ones, i.e., one employing a 2-head type RAM disc system equipped with both a recording head and a reproducing head, and the other employing a 1-head type RAM disc system equipped with a recording and reproducing head.

Figure 2:
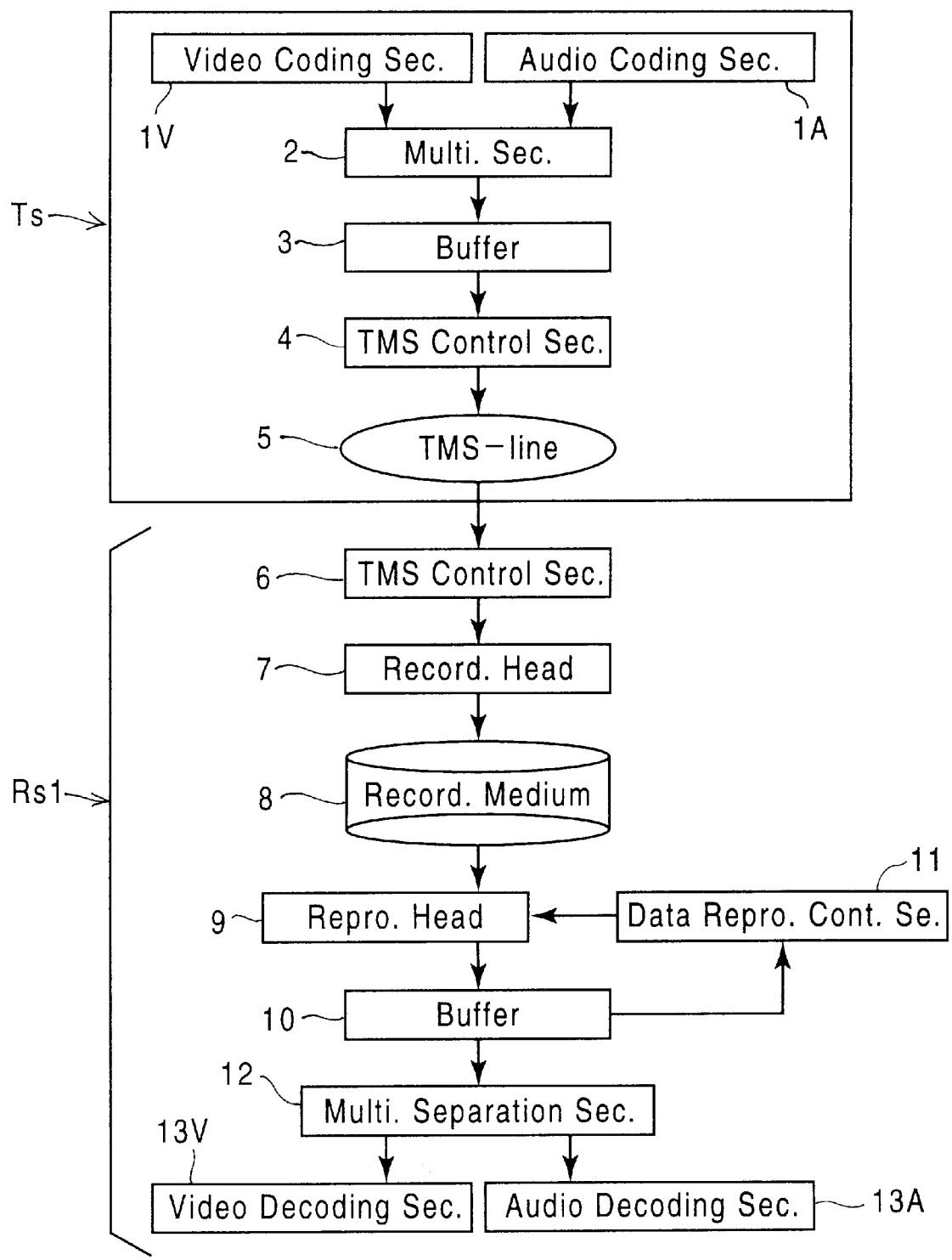
FIG. 2 is a block diagram of a first embodiment of a recording and reproducing apparatus equipped with a 2-head type RAM disc system for recording and reproducing coded signal transmitted from the transmission system in the present invention.

FIG. 2 is a block diagram of a first embodiment of a recording and reproducing apparatus equipped with a 2-head type RAM disc system for recording and reproducing coded signal transmitted from the transmission system in the present invention.

First, an explanation is given of the first embodiment of the recording and reproducing apparatus equipped with the 2-head type RAM disc for recording and reproducing coded signals transmitted from the transmission system referring to FIG. 2.

In FIG. 2, a reference character Ts designates a transmission system, and Rs1 a recording and reproducing apparatus for recording and reproducing a coded signal transmitted from the transmission system Ts in the first embodiment of the present invention.

In the transmission system Ts, the video and audio information signals are respectively coded at a predetermined coding rate by a video coding section 1V and an audio coding section 1A, and these data are multiplexed together by a multiplexing section 2.

The multiplexed data are buffered by a buffer memory 3 and are smoothed and converted by a transmission control section 4 according to a protocol of its own of a transmission-line 5 at a predetermined transmission rate several times as large as the coding rate so as to be transmitted thereto.

In the apparatus Rs1 for recording and reproducing a coded signal transmitted from the transmission system Ts, the data are converted into the converted data by a transmission control section 6, and are recorded in the recording medium 8 by using the recording head 7, wherein the data are recorded therein with a transmission rate in which headers of its won of the transmission system is removed.

In the apparatus Rs1 equipped with the 2-head type RAM disc, the exclusive recording head 7 is employed. Upon recording, a recording rate of the RAM disc as the recording medium 8 is synchronized with a transmission rate (a first transmission rate) Ra approximately equal to the actual transmission rate at which the data is actually transmitted.

The actual transmission rate is mostly made to be higher than the first transmission rate Ra because the actual transmission rate contains the headers of its won of the transmission system.

The data are recorded in the RAM disc 8 at the first transmission rate Ra of the multiplexed data where the headers are removed.

On the other hand, the exclusive reproducing head 9 independently provided directly reproduce the data recorded in the RAM disc 8 by the exclusive recording head 7.

Upon reproducing, the data are reproduced at the first transmission rate Ra which is a several times as large as a coding rate (a second transmission rate) Rb. Thus, the buffer memory 10 overflows readily.

Accordingly, when the buffer memory 10 becomes almost full (for instance, 99%), the reproducing operation of data from the RAM disc 8 is interrupted.

For the above interruption of the reproducing operation, when the buffer memory 10 becomes almost full (for instance, 90%), a message signal thereof is provided to a data reproducing control section 11 form the buffer memory 10. Thereby, the data reproducing section 1 issues the reproducing interrupting instruction for the exclusive reproducing head 9.

Specifically, the interruption of the reproducing operation is performed by successively continuing a return operation of the exclusive reproducing head 9 by one track until a reproducing starting instruction is issued.

The data in the buffer memory 10 is consumed by being decoded at the coding rate Rb. When the buffer memory 10 becomes empty to some degree (for instance, 25%), a message signal thereof is provided to a data reproducing control section 11 from the buffer memory 10. Thereby, the data reproducing control section 11 issues the reproducing starting instruction to the exclusive reproducing head 9.

Reproducing starting operation is made by releasing the return operation of the exclusive reproducing head 9.

When the program recorded in the RAM disc 8 is reproduced again, the program is reproduced at the transmission rate (the first transmission rate) Ra by the exclusive reproducing head 9.

When the buffer memory 10 becomes almost full (for instance, 99%), the reproducing operation from the RAM disc 8 is interrupted. This operation is repeated.

The decoding of the coded data is performed at the transmission rate (the second transmission rate) Rb by a picture decoding section 13V and a sound decoding section 13A through a multiple-separation section 12.

Figure 3:
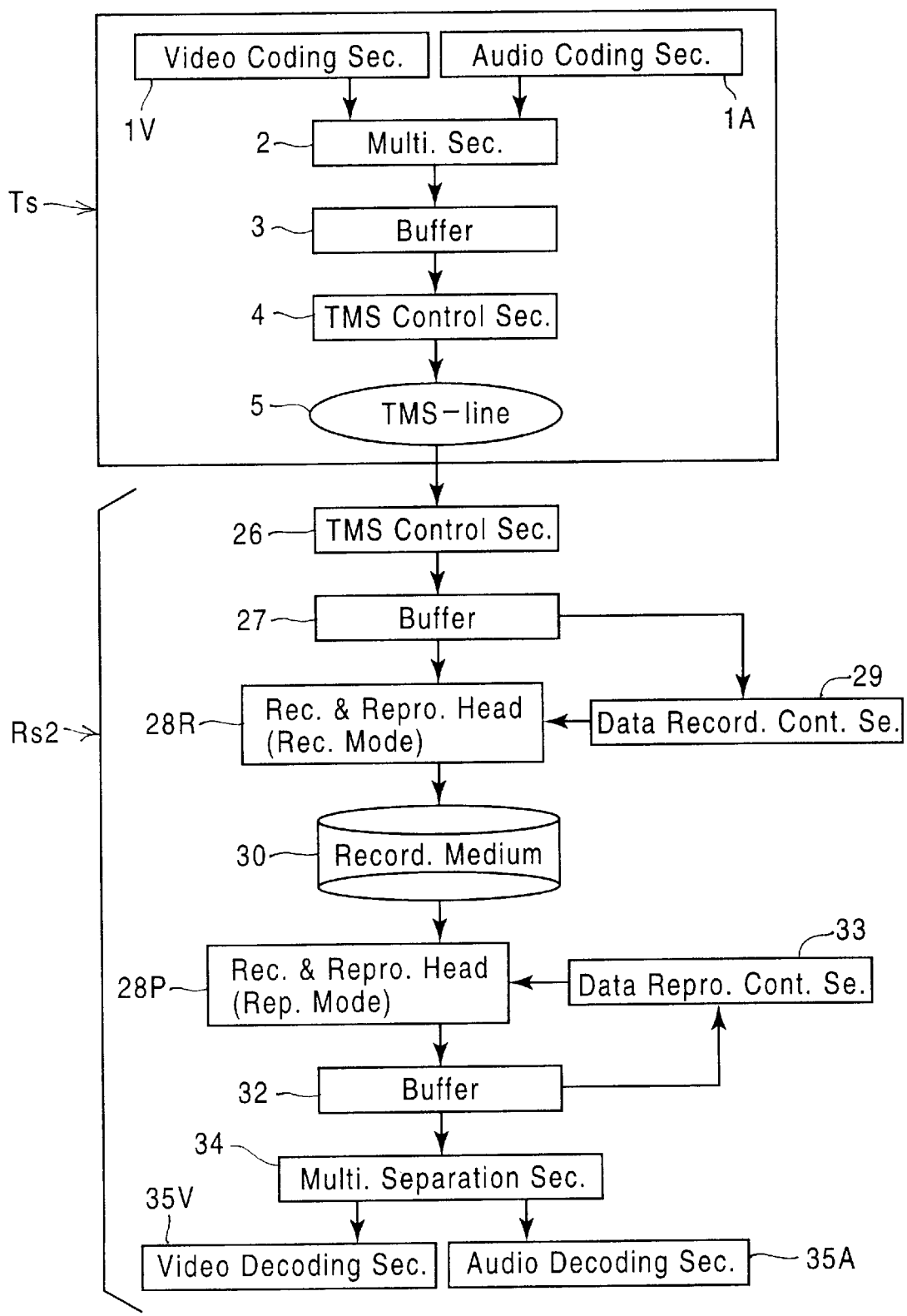
FIG. 3 is a block diagram of a second embodiment of the recording and reproducing apparatus equipped with the 1-head type RAM disc system.

FIG. 3 is a block diagram of a second embodiment of the recording and reproducing apparatus equipped with the 1-head type RAM disc system.

Next, the description is given of a second embodiment of the recording and reproducing apparatus equipped with the 1-head type RAM disc system referred to FIG. 3.

The transmission system Ts is the same as that in the embodiment shown in FIG. 2. Thus, the description thereof is omitted here.

In the apparatus Rs2 for recording and reproducing a coded signal transmitted from the transmission system Ts equipped with the 1-head type RAM disc system, the data are converted into the converted data by a transmission control section 26, and are stored in the buffer memory at the first transmission rate Ra.

The recording rate of the RAM disc 30 is made to be higher than the first transmission rate Ra which is approximately equal to the transmission rate of the data.

In other words, the recording rate of the RAM disc 30 is synchronized with a third transmission rate Rc which is larger than a sum of the coding rate (the second transmission rate) Rb and the first transmission rate Ra.

When the buffer memory 27 becomes almost full (for instance, 99%) due to buffering of the multiplexed data, a message signal thereof is transmitted to the data recording control section 29 from the buffer memory 27. The data recording control section 29 issues a recording instruction to the recording and reproducing head 28R. Here, the recording and reproducing head 28R is made to be in recording mode, the multiplexed data are recorded at the third transmission rate Rc on the RAM disc 30 with the head 28R.

On the other hand, while the multiplexed data are stored at the first transmission rate Ra in the buffer memory 27, the recording and reproducing head (28p) are converted to the reproduction mode, and the multiplexed data recorded are reproduced from the RAM disc 30, and sent to the buffer memory 32. Th reproduced data are stored in the buffer memory 32 at the third transmission rate Rc.

Upon reproducing, the multiplexed data are reproduced at the transmission rate (the third transmission rate) Rc several times as large as the coding rate Rb. Thus, the buffer memory 32 readily overflows.

Accordingly, when the buffer memory 32 becomes almost full (for instance, 99%), the reproducing operation from the RAM disc 30 is interrupted.

When the buffer memory 37 becomes almost full (for instance, 99%) due to buffering of the multiplexed data, a message signal thereof is transmitted to a data reproducing control section 33 from the buffer memory 37. The data reproducing control section 33 issues a reproduction stopping instruction to the recording and reproducing head 28P. The reproduction stopping operation is realized to continue the return operation of the one track until the reproduction starting instruction is issued.

The coded data is consumed in the buffer memory 32 being decoded at the coding rate Rb. When the buffer memory 32 becomes empty to some degree (for instance, 25%), a message signal thereof is provided to a data reproducing control section 33 from the buffer memory 32. Thereby, the data reproducing control section 33 issues the reproducing starting instruction to the recording and reproducing head 28P.

Reproducing starting operation is made by releasing the return operation of the recording and reproducing head 28P.

Figure 4A:
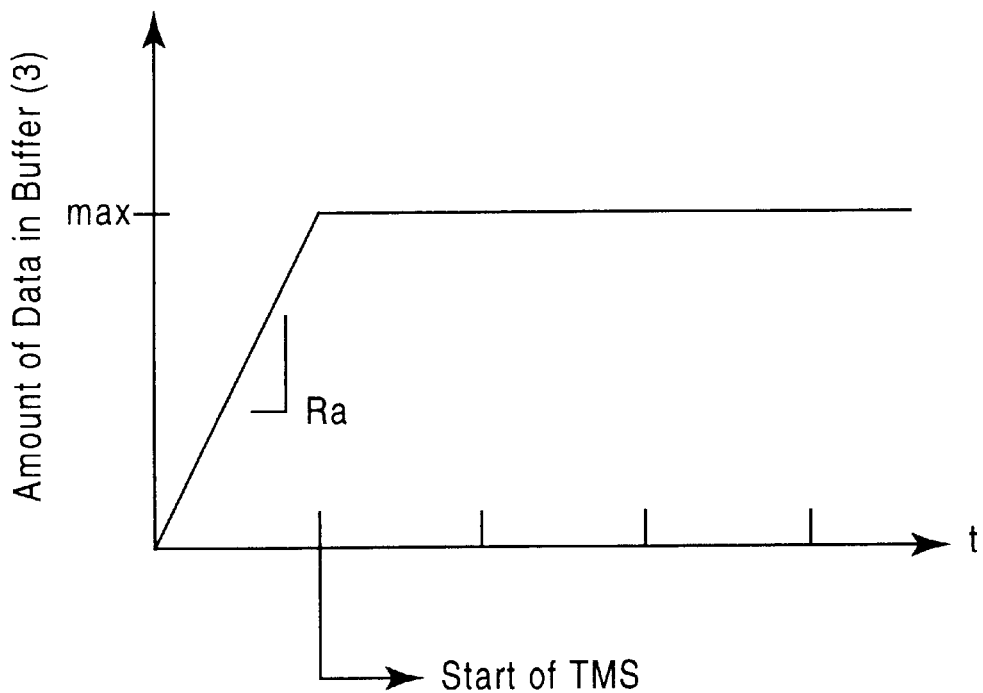
FIGS. 4(a) and 4(b) are charts for explaining recording and reproducing timing of the first embodiment (2-head type) of the recording and reproducing apparatus.
Figure 4B:
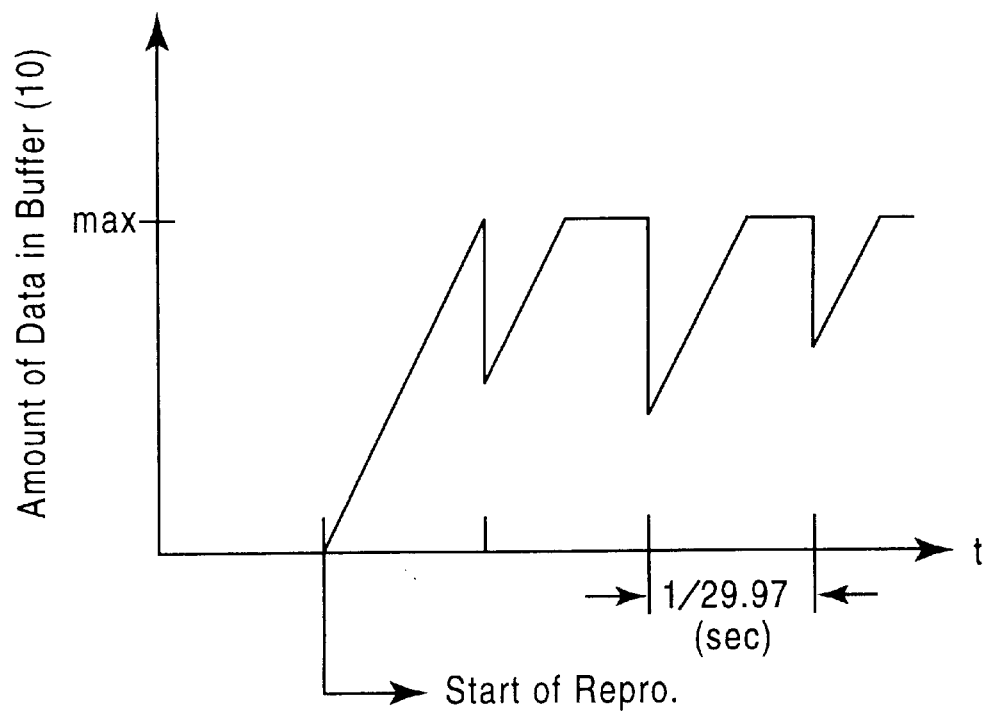

Next, the description is given of timing charts of the first embodiment of the present invention referred to FIGS. 4(a) and 4(b).

FIGS. 4(a) and 4(b) are charts for explaining recording and reproducing timing of the first embodiment (2-head type) of the recording and reproducing apparatus Rs1.

As shown in FIG. 4(a), the input data are inputted to the buffer memory 3 at a transmission rate (a first transmission rate) Ra which is several times as large as the coding rate (the second transmission rate) Rb.

When the buffer memory 3 is filled with the data to the maximum level, the transmission of data is started at the first transmission rate Ra. Thus, the data in the buffer memory 3 are maintained at the maximum level as shown in FIG. 4(a).

In the recording and reproducing apparatus Rs1 of the first embodiment, the RAM disc 8 has both the recording head 7 and the reproducing head 9. Thus, it is possible to reproduce the data from the RAM disc 8 while the data are recorded thereon.

The reproduction is performed at the transmission rate Ra, and the data are stored in the buffer memory 10 at the maximum. Then, the decode of the data is started.

The coding rate Rb is much smaller than the transmission rate Ra. Thus, as shown in FIG. 4(b), when the buffer 10 memory becomes in the maximum state (full), the reproduction is interrupted by the return motion of the reproducing head.

Figure 5A:
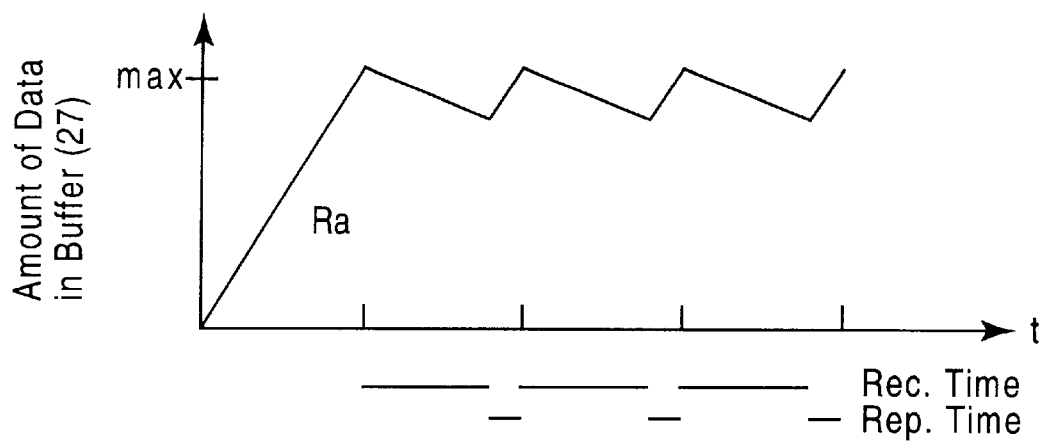
FIGS. 5(a), 5(b) and 5(c) are charts for explaining recording and reproducing timing of the second embodiment (1-head type) of the recording and reproducing apparatus.
Figure 5B:
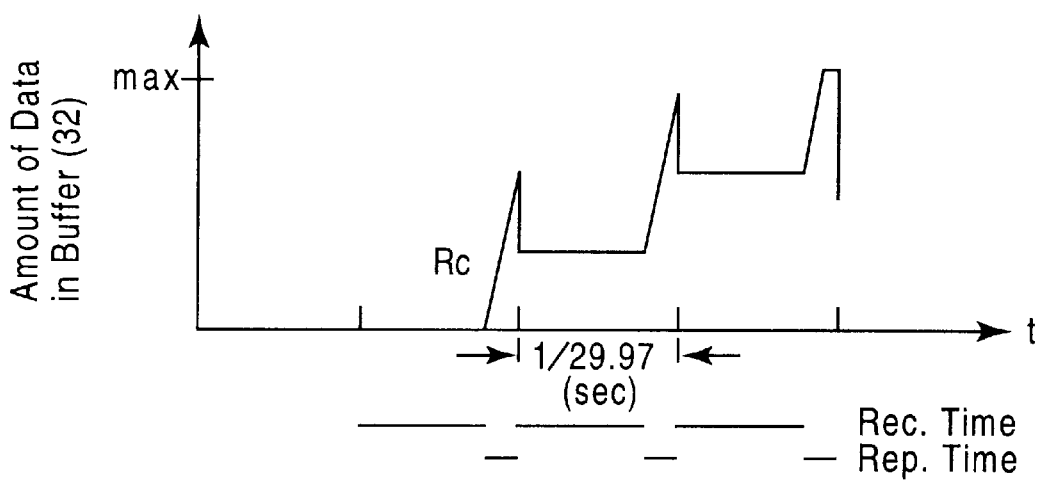
Figure 5C:
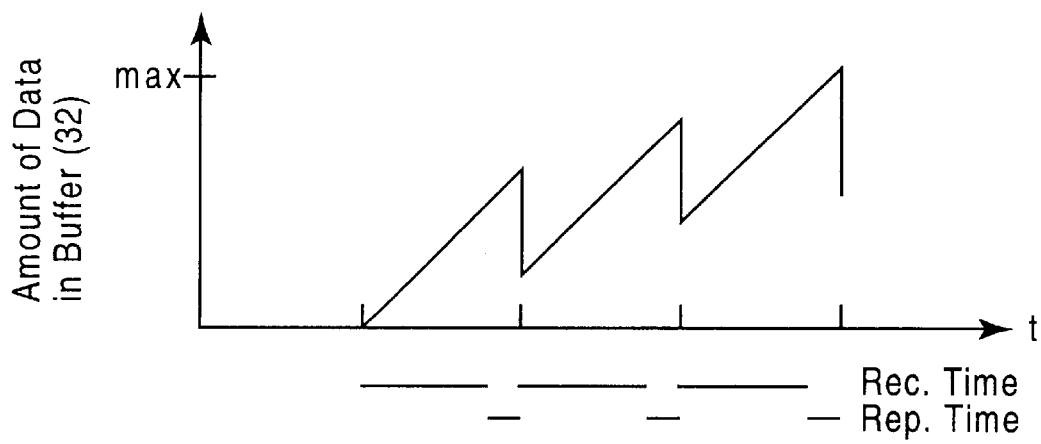

Next, the description is given of timing charts of the second embodiment (1-head type) of the recording and reproducing apparatus Rs2 referred to FIGS. 5(a), 5(b), 5(c).

FIGS. 5(a), 5(b) and 5(c) are charts for explaining recording and reproducing timing of the second embodiment (1-head type) of the recording and reproducing apparatus Rs2.

As shown in FIG. 5(a), the input data are transmitted to the buffer memory 27 at the transmission rate (the first transmission rate) Ra and stored therein until the maximum state. Then, the data in the buffer memory 27 are recorded on the RAM disc 30 by the recording head 28R at a recording and reproducing rate Rc which is larger than the transmission rate (the fist transmission rate) Ra. Thereby, the data in the buffer memory 27 is decreased. The data decreased are supplied again at the transmission rate Ra by stopping the recording. While stopping the recording, the reproduction is performed by switching the recording head 28R to the reproducing head 28P.

As shown in FIG. 5(b), the data are abruptly inputted to the buffer memory 32 at the rate Rc by being reproduced from the RAM disc 8 by the reproducing head 28P. The data in the buffer memory are abruptly decreased when each of pictures is decoded, and the data are not changed until the successive picture display time.

There is shown in FIG. 5(c) an average of the abrupt input data which is obtained by averaging the abrupt input data over each picture display time ($1/29.97$ sec.).

Figure 1:
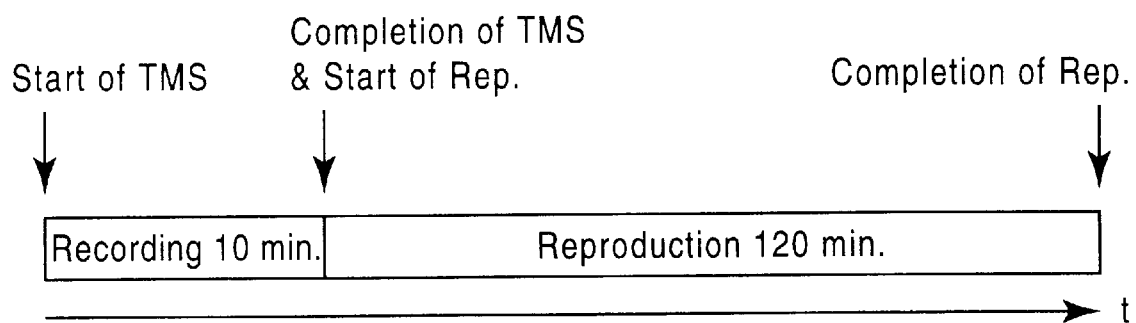
FIG. 1 is a chart showing a time relation between the transmission time of data of a program and a reproduction time of the data thereof in the prior art.
Figure 6:
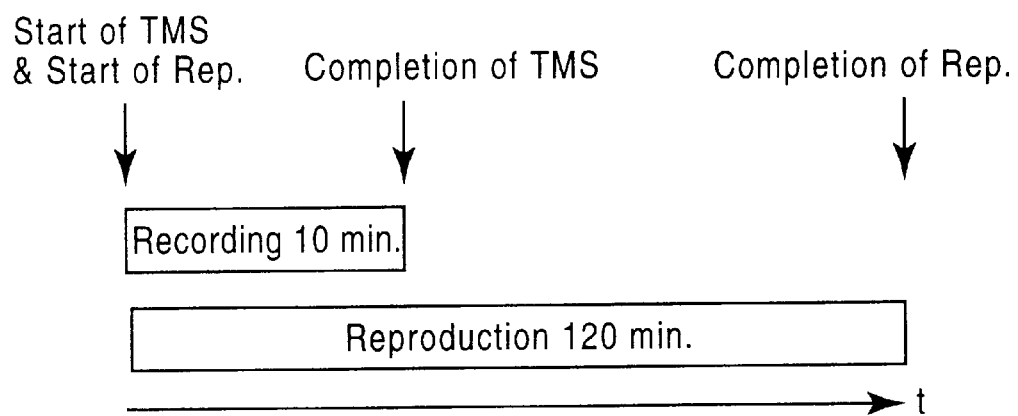
FIG. 6 is a chart for explaining the concept of the present invention.

FIG. 6 is a chart for explaining the concept of the present invention.

As mentioned above, according to the recording and reproducing apparatus of the present invention, it is possible to reproduce the transmitted data as soon as the data is transmitted to the apparatus without awaiting a completion of recording of all the data transmitted to the recording medium as shown in FIG. 6, wherein the reproduction of the transmitted data starts as soon as the data are recorded on the RAM disc.

Thus, it is good enough for the transmission band as long as it is larger than the coding rate, resulting in a reduction of transmission cost.

Further, it is not necessary to reduce the transmission rate because of no restriction with respect to the recording time, resulting in the improvement of image and sound quality.

What is claimed is:

1. An apparatus for recording and reproducing a coded signal on/from a recording medium, the coded signal being coded at a predetermined coding rate (Rb) and transmitted for a time shorter than an actual reproducing time at a transmission rate higher than the coding rate (Rb), the apparatus comprising:

first buffer memory for storing the coded signal at a first transmission rate (Ra) substantially equal to the transmission rate;

recording and reproducing means for recording the coded signal outputted from the first buffer memory on a recording medium at a second transmission rate (Rc)

higher than the first transmission rate (Ra), for reproducing the coded signal recorded on the recording medium at the second transmission rate (Rc);

recording control means for issuing a recording instruction to the recording and reproducing means when the first buffer memory is filled with a certain amount of the coded signal reproduced by the recording and reproducing means;

second buffer memory for storing the coded signal reproduced by the recording and reproducing means at the second transmission rate;

reproducing control means for interrupting a reproduction operation of the recording and reproducing means when the second buffer memory is filled with a certain amount of the coded signal; and decoding means for decoding the coded signal from the second buffer memory at the coding rate to reproduce in real time by using the reproducing control means, wherein the recording is performed at the second transmission rate (Rc) by using a recording head, the reproducing is performed at the second transmission rate (Rc) by using a reproducing head and wherein the reproducing of the coded is performed while the coded in the first buffer memory is being decreased from maximum state by stopping the recording and switching the recording head to the reproducing head.

2. The apparatus as claimed in claim 1, wherein the second transmission rate (Rc) is larger than a sum of the coding rate (Rb) and the first transmission rate (Ra).

3. A method for recording and reproducing a coded signal on/from a recording medium, the coded signal being coded at a predetermined coding rate (Rb) and transmitted for a time shorter than an actual reproduction time at a fixed transmission rate higher than the coding rate (Rb), the method comprising the steps of:

storing the coded signal in a first buffer memory at a first transmission rate (Ra) substantially equal to the fixed transmission rate;

recording the coded signal outputted from the first buffer memory on a recording medium at a second transmission rate (Rc) higher than the first transmission rate (Ra) by issuing a recording instruction when the first buffer memory is filled with a certain amount of the coded signal;

reproducing the coded signal recorded on the recording medium at the second transmission rate (Rc) so as to store the coded signal in a second buffer memory; and decoding the coded signal from the second buffer memory at the coding rate (Rb) to reproduce in real time by interrupting the reproduction of the coded signal when the second buffer memory is filled with a certain amount of the coded signal, wherein the recording is performed at the second transmission rate (Rc) by using a recording head, the reproducing is performed at the second transmission rate (Rc) by using a reproducing head, and wherein the reproducing of the coded signal is performed while the coded signal in the first buffer memory is being decreased from the maximum state by stopping the recording and switching the recording head to the reproducing head.

4. The method as claimed in claim 3, wherein the second transmission rate (Rc) is larger than a sum of the coding rate (Rb) and the first transmission rate (Ra).

* * * * *